US010146998B2

(12) United States Patent
Jamison et al.

(10) Patent No.: US 10,146,998 B2
(45) Date of Patent: Dec. 4, 2018

(54) DISTRIBUTING INFORMATION USING ROLE-SPECIFIC AUGMENTED REALITY DEVICES (71) Applicant: HALLIBURTON ENERGY SERVICES, INC., Houston, TX (US)

(72) Inventors: Dale E. Jamison, Humble, TX (US); Robert L. Williams, Spring, TX (US); Amir Bar, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/538,576

(22) PCT Filed: Feb. 13, 2015

(86) PCT No.: PCT/US2015/015942
§ 371 (c)(1),
(2) Date: Jun. 21, 2017

(87) PCT Pub. No.: WO2016/130161
PCT Pub. Date: Aug. 18, 2016

(65) Prior Publication Data
US 2017/0351918 A1    Dec. 7, 2017

(51) Int. Cl.
G06K 7/10 (2006.01)
G06K 9/00 (2006.01)
(Continued)

(52) U.S. Cl.
CPC .......... G06K 9/00671 (2013.01); G06F 3/011 (2013.01); G06F 3/04817 (2013.01);
(Continued)

(58) Field of Classification Search
CPC .......... G06K 7/10722; G06K 9/00671; G06K 7/1417; H04N 5/23293
(Continued)

(56) References Cited

U.S. PATENT DOCUMENTS 7,603,629 B1   10/2009   Crosswhite et al.
8,965,741 B2 *  2/2015   McCulloch ........... G06T 19/006
                                                            345/419
(Continued)

FOREIGN PATENT DOCUMENTS

KR   20130131181 A   12/2013
WO   2014117825 A1    8/2014

OTHER PUBLICATIONS

International Search Report and Written Opinion; PCT Application No. PCT/US2015/015942; dated Nov. 9, 2015.
(Continued)

Primary Examiner — Claude J Brown
(74) Attorney, Agent, or Firm — Polsinelli PC (57) ABSTRACT A role-based information distribution system, in some embodiments, comprises a display to provide an image containing multiple dynamic icons. It further comprises a wearable device camera to capture the image, and processing logic, coupled to the camera, to interpret the multiple dynamic icons and to provide information pertaining to a selected one or more of the multiple dynamic icons to a user via the wearable device. The processing logic selects the selected one or more of the multiple dynamic icons based on a role associated with the user.

20 Claims, 9 Drawing Sheets (51) Int. Cl.
   *G06F 3/01* (2006.01)
   *G06F 3/0481* (2013.01)
   *G06K 7/14* (2006.01)
   *G06T 11/60* (2006.01)
   *H04N 5/232* (2006.01)

(52) U.S. Cl.
   CPC ....... *G06K 7/10722* (2013.01); *G06K 7/1417* (2013.01); *G06T 11/60* (2013.01); *H04N 5/23293* (2013.01)

(58) Field of Classification Search
   USPC .................................................. 235/462.11
   See application file for complete search history.

(56) References Cited

U.S. PATENT DOCUMENTS

| | | | |
|---|---|---|---|
| 9,122,321 B2* | 9/2015 | Perez | G06F 3/033 |
| 2010/0257464 A1 | 10/2010 | Renner | |
| 2010/0281415 A1 | 11/2010 | Wasko et al. | |
| 2010/0329642 A1 | 12/2010 | Kam et al. | |
| 2011/0249122 A1 | 10/2011 | Tricoukes et al. | |
| 2011/0289106 A1* | 11/2011 | Rankin, Jr. | G06Q 10/10 |
| | | | 707/769 |
| 2012/0306850 A1* | 12/2012 | Balan | G06T 19/006 |
| | | | 345/419 |
| 2012/0310602 A1 | 12/2012 | Jacobi et al. | |
| 2013/0037608 A1* | 2/2013 | Evevsky | G06F 21/31 |
| | | | 235/380 |
| 2013/0093759 A1* | 4/2013 | Bailey | G09G 5/00 |
| | | | 345/419 |
| 2013/0127980 A1* | 5/2013 | Haddick | G06F 3/013 |
| | | | 348/14.08 |
| 2013/0147836 A1* | 6/2013 | Small | G06F 3/011 |
| | | | 345/633 |
| 2013/0147838 A1* | 6/2013 | Small | G06F 3/013 |
| | | | 345/633 |
| 2014/0101608 A1* | 4/2014 | Ryskamp | G06F 3/0482 |
| | | | 715/810 |
| 2014/0122347 A1* | 5/2014 | Moran | G06Q 10/30 |
| | | | 705/308 |
| 2014/0147829 A1* | 5/2014 | Jerauld | G06F 1/163 |
| | | | 434/430 |
| 2016/0267808 A1* | 9/2016 | Agostini | G06K 9/00671 |

OTHER PUBLICATIONS

English Abstract of KR20130131181; retrieved Jun. 19, 2017 from www.espacenet.com.

* cited by examiner

DISTRIBUTING INFORMATION USING ROLE-SPECIFIC AUGMENTED REALITY DEVICES

CROSS-REFERENCE TO RELATED APPLICATIONS

This application is a national stage entry of PCT/US2015/015942 filed Feb. 13, 2015, said application is expressly incorporated herein in its entirety.

BACKGROUND

The oil and gas industry employs numerous professionals across a wide variety of academic disciplines. For instance, a single corporation may employ geologists, geophysicists, petroleum engineers, drilling engineers, and drilling rig personnel, among many others. Because these professionals frequently collaborate with each other on various projects, the capability to share information with each other is essential, and the ability to seamlessly collect, process, and distribute relevant information in real-time across all of these disciplines would be particularly advantageous. Current technology, however, is limited in this regard.

For example, a meeting of employees from varying disciplines may involve the use of a display (e.g., to present a slideshow). While the display may present information that is useful to the employees in attendance, the employees are limited in their ability to interact with the display and to obtain additional data in real-time that is relevant to their specific roles within the organization. Accordingly, a technology that removes these and other inefficiencies by facilitating the seamless, real-time sharing of relevant information across an organization is desired.

BRIEF DESCRIPTION OF THE DRAWINGS

Accordingly, there are disclosed in the drawings and in the following description various methods and systems for distributing information using role-specific augmented reality devices. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for facilitating the seamless and real-time collection, processing and distribution of information using augmented reality devices. In embodiments, a controller—for instance, a computer—wirelessly communicates with and controls multiple eyewear devices that implement augmented reality (e.g., GOOGLE GLASS®). Augmented reality is a live view of a physical, real-world environment whose elements are augmented by computer-generated sensory input, such as sound, video, graphics, or global positioning system (GPS) data. The controller also has access to and control over various types of equipment (e.g., drilling equipment, logging tools, employee computers). Based on input that it receives from the eyewear devices, the equipment, and resources (e.g., historical data, well logs, geographical data, geophysical data) to which it has access, the controller performs any of a variety of actions. Potential controller actions are wide-ranging and may include, without limitation, controlling oilfield equipment or eyewear devices, providing information to users of oilfield equipment or of eyewear devices, and communicating with other electronic devices via a network. Because employees regularly or constantly wear the eyewear devices, output from the controller is seamlessly provided to the user of the eyewear devices in real-time, and input (e.g., images, sound, video, tactile input) is seamlessly collected using the eyewear devices and provided to the controller in real-time. Additionally, in some applications, computer displays may be programmed to interact with the eyewear devices so as to provide the users of the eyewear devices with the ability to interact with and obtain additional information from the displays.

Figure 1:
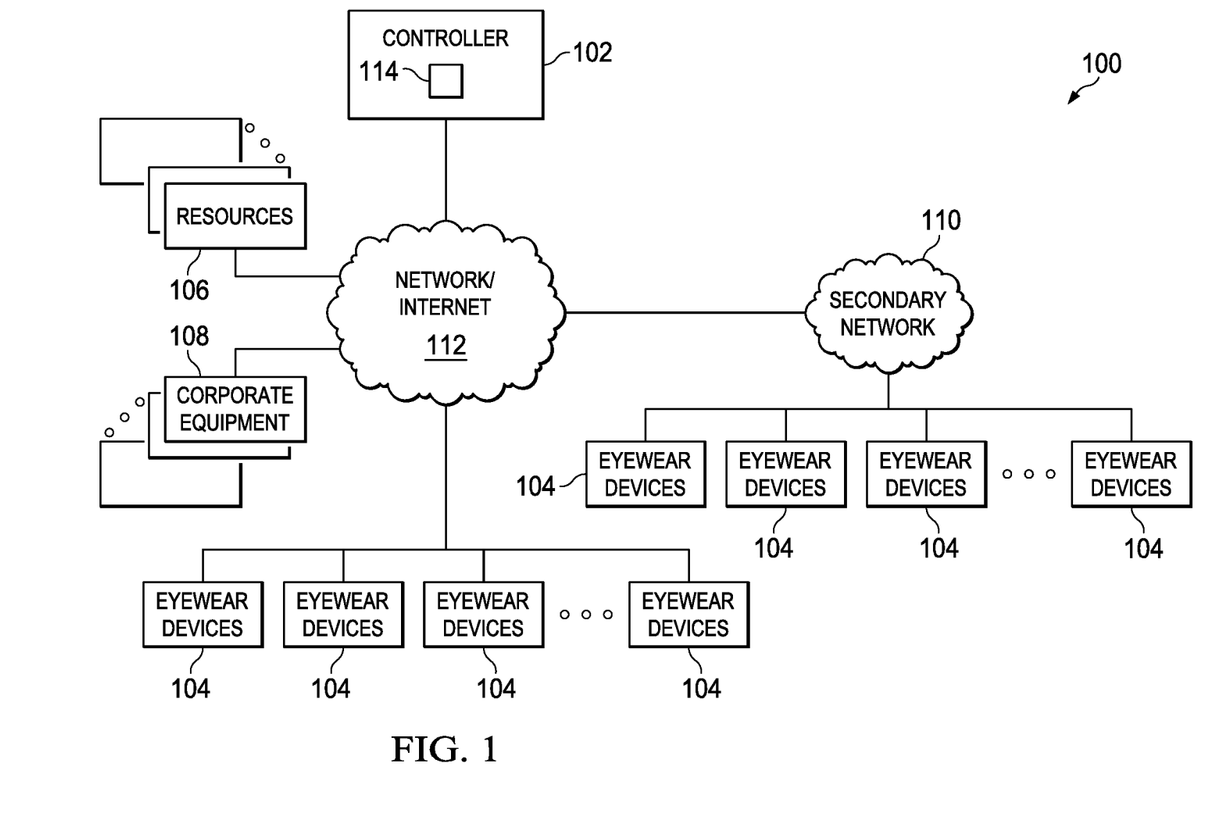
FIG. 1 is a block diagram of an information collection, processing and distribution system in accordance with embodiments.

FIG. 1 is a block diagram of an illustrative information collection, processing and distribution system 100. Although the system 100 may be deployed in any suitable context, this disclosure describes the system in the context of an oil and gas corporation. The system 100 comprises a controller 102 that controls the system 100, a plurality of augmented reality eyewear devices 104, resources 106, corporate equipment 108, and a secondary network 110, all of which communicate with each other by way of a primary network (e.g., the Internet) 112. The controller 102 comprises any suitable machine, network of machines, organization of people, or combination thereof that is able to perform the actions of the controller 102 described herein. The system 100 is not limited to these examples.

The network 112 is any suitable computer network that enables multiple computing devices to communicate with each other. It may comprise, without limitation, the Internet, a virtual private network, a local area network, a wide area network and/or any other such network or combination of networks. The network 112 may be a public network or a private, restricted network. The secondary network 110 may or may not be the same type of network as the network 112.

The resources 106 are wide-ranging and may include any and all types of information that facilitate the operations of the controller 102 and that the controller 102 can access by way of a network. The resources 106 may be stored on various types of storage (e.g., servers that are not specifically shown) and may include, without limitation, wellbore data, drilling logs, well logs, geological data, geophysical data, historical data of all kinds, equipment data, databases, software applications, workflows, corporate policies and procedures, personnel data and directories, specific persons, and other such types of information. The resources 106 may be co-located or they may be distributed across various locations. The corporate equipment 108 includes any and all equipment—whether physical (e.g., drilling equipment, wireline tools, employee computers, gauges, meters, valves) or virtual (e.g., software applications)—that can be controlled remotely by the controller 102 or the eyewear devices 104.

The eyewear devices 104 are augmented reality devices that can be worn on the human head in a manner similar to eyeglasses. Although the scope of this disclosure is not limited to any particular type or brand of eyewear devices, in at least some embodiments, the eyewear devices 104 comprise GOOGLE GLASS® devices. As explained above, augmented reality is a live view of a physical, real-world environment whose elements are augmented by computer-generated sensory input, such as sound, video, graphics, or global positioning system (GPS) data. Thus, in the system 100, an eyewear device 104 permits the user to see his surroundings as he normally would, but it also projects virtual images toward the user's eye that augments the user's field of vision with additional information that may be useful to the user. This augmented information may include information provided by the controller 102, one or more other eyewear devices 104, corporate equipment 108, or any other suitable source. In addition to receiving and displaying information to a user of the eyewear devices 104, the eyewear devices 104 may collect information and provide it to other systems and devices coupled to the network 112, such as the controller 102 and corporate equipment 108. The eyewear devices 104 may obtain such information by, e.g., capturing images, video, sound and/or tactile input from a user.

In some embodiments, the eyewear devices 104 communicate wirelessly with the controller 102. The term "wirelessly" is not intended to suggest that the communication pathway between the controller 102 and the eyewear devices 104 is entirely devoid of wires; rather, the terms "wireless" and "wirelessly," as used herein, mean that the eyewear devices 104 themselves connect to a network (e.g., the Internet) without the use of wires to at least some extent— for example and without limitation, through a Wi-Fi connection to a wireless access point, a cellular data connection (e.g., 3G/4G), or a Bluetooth connection.

Although this disclosure describes the use of eyewear devices, any wearable device may be used, including eyewear, helmets, implantable devices, wristbands or smartwatches, etc. All such wearable devices will have some or all of the attributes ascribed to the eyewear devices herein, and will at a minimum have the attributes necessary to perform the actions described herein. All such wearable devices are contemplated and included within the scope of the disclosure.

In operation, executing the software 114 causes the controller 102 to obtain information from one or more of the eyewear devices 104, the resources 106 and the corporate equipment 108 and, after considering all information available to it, to perform one or more actions. For instance, a rig hand wearing an eyewear device 104 may notice that a particular instrument on the rig is in an unsafe state and that the instrument must be shut off to avoid an accident. Accordingly, the rig hand may use voice or tactile input to the eyewear device 104 to alert the controller 102 about the unsafe condition. The controller 102, in turn, may use GPS and any other useful information (e.g., images captured using the eyewear device 104 camera) to determine the rig hand's precise location. The controller 102 may then access resources 106 to determine, for instance, the appropriate safety procedure to follow in this particular situation. Having obtained relevant information from the eyewear device 104 and the resources 106, the controller 102 communicates with the unsafe instrument and causes it to shut off. As one of ordinary skill will understand, the software 114 is tailor made to enable the controller 102 to act appropriately within the context of the particular environment (e.g., corporation) in which the controller 102 is deployed.

Figure 2:
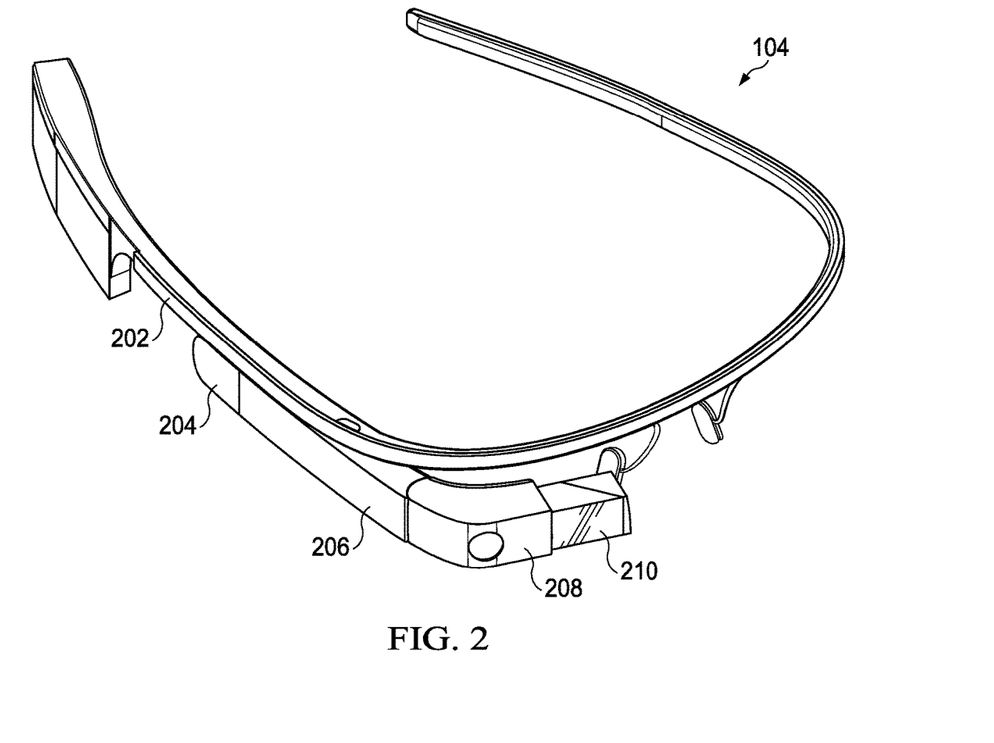
FIG. 2 is a perspective view of a role-specific augmented reality eyewear device in accordance with embodiments.

FIG. 2 is a perspective view of an eyewear device 104. The eyewear device 104 comprises a frame 202, a power housing 204, a computer housing 206, a visual equipment housing 208, and a prism 210. The power housing 204 houses a power source, such as a battery, that provides power to electronics coupled to the device 104. The computer housing 206 houses various circuit logic, including processing logic, GPS unit, speaker, microphone, tactile input unit, network transceiver, and storage. In some embodiments, the tactile input unit detects tactile input when the user touches the outer casing of the computer housing 206 with one or more fingers, although other techniques for detecting tactile input are contemplated. The visual equipment housing 208 houses a camera to capture images and a projector to display virtual images to the user's eye via the prism 210.

Figure 3:
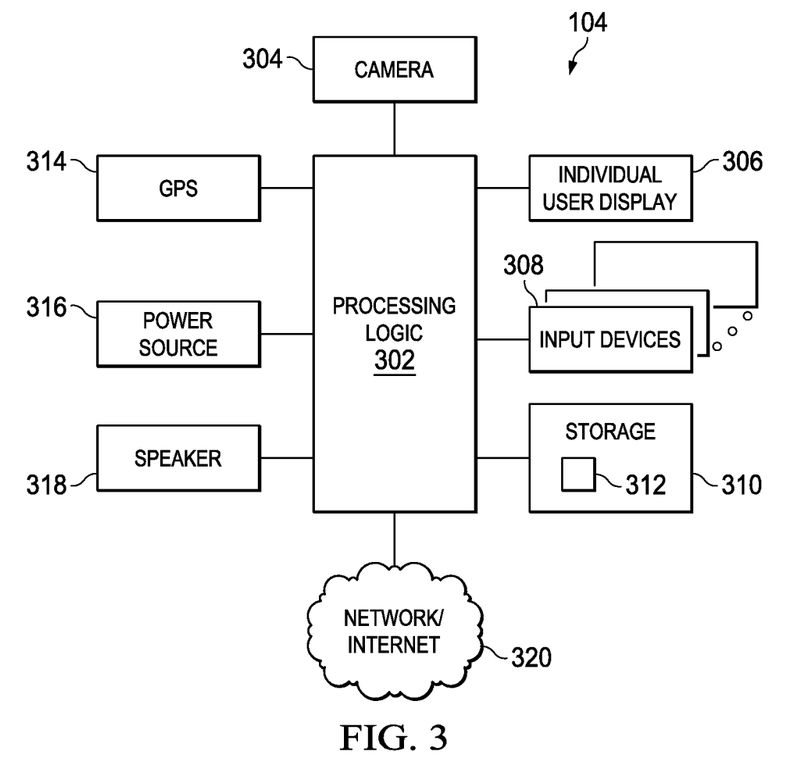
FIG. 3 is a block diagram of components within an augmented reality eyewear device, in accordance with embodiments.

FIG. 3 is a block diagram of components within an eyewear device 104. The eyewear device 104 comprises processing logic 302 (e.g., one or more processors), a camera 304, an individual user display 306 (e.g., a projector and the prism 210), one or more input devices 308 (e.g., tactile input unit, microphone), storage 310 storing software 312 that the processing logic 302 executes to perform the functions of the eyewear device 104, a GPS unit 314, a power source 316, a speaker 318 and a network adapter 320. In operation, the power source 316 powers the processing logic and all other components of the eyewear device 104 that require power. The GPS unit 314 determines the coordinates of the location of the eyewear device 104 and provides them to the processing logic 302 when requested. The processing logic 302 provides audio output to the speaker 318, which provides the audio output to the user of the eyewear device 104. The network adapter 320 enables the processing logic 302 to communicate wirelessly with one or more other electronic devices (e.g., the controller 102) via a network, such as the Internet. The storage 310 stores the software 302 as well as other data that the processing logic 302 may access (e.g., images, audio files). The input devices 308 enable the user to interact with the eyewear device 104; for instance, the user may use tactile input or voice commands to select from one of multiple options presented to him via the speaker 318 or the individual user display 306. The individual user display 306 provides all visual information from the processing logic 302 to the user's eye. The camera 304 captures images of objects appearing in front of the camera 304 and provides the images to the processing logic 302 for further, suitable use.

Figure 4:
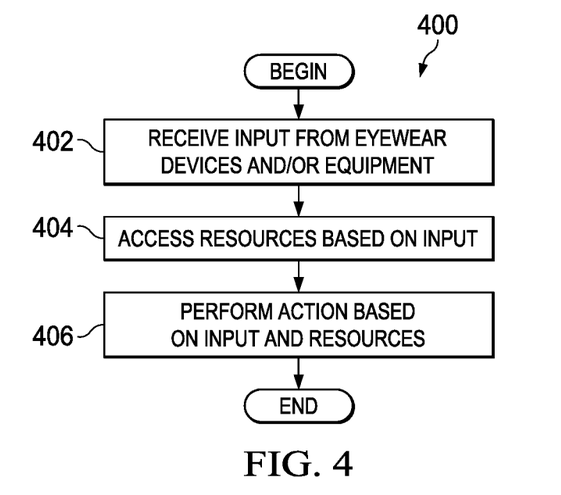
FIG. 4 is a flow diagram of a method in accordance with embodiments.

FIG. 4 is a flow diagram of a method 400 that the controller 102 uses to control the system 100. The method 400 comprises receiving input from the eyewear devices 104 and/or corporate equipment 108 (step 402). As described above, such input from the eyewear devices 104 may include images captured using the camera 304, input devices 308 and/or GPS 314. In the case of corporate equipment 108, the input may include, without limitation, instrument readings, logging data, and any other data that may be communicated between physical or virtual equipment and the controller 102. The method 400 further comprises accessing resources 106 based on the input received during step 402 (step 404). As explained, the resources 106 are wide-ranging and may include, without limitation, well logs, geological data, geophysical data, historical data of all kinds, databases, software applications, workflows, corporate policies and procedures, personnel data and directories, specific persons, and other such types of information. The method 400 also comprises performing one or more actions based on the input received during step 402 and the resources accessed during step 404 (step 406). Such actions are wide-ranging and may include, without limitation, accessing and controlling any eyewear device 104, resources 106, corporate equipment 108, and/or any other device with which communication may be established via the network 112. The method 400 is not limited to the precise set of steps shown in FIG. 4, and steps may be added, deleted or modified as may be suitable.

Multiple examples of the operation of the system 100 are now provided. These examples are merely illustrative, and they do not limit the scope of this disclosure in any way. In one example, the controller 102 leverages the GPS technology embedded within the eyewear devices and potentially in other devices within the corporation to maintain location data for all employees and inventory (e.g., equipment, products). For instance, the GPS units in the eyewear devices may periodically transmit GPS coordinates to the controller 102 so that the controller is regularly updated on the position of each eyewear device within the corporation. Similarly, all suitable types of equipment and inventory may be equipped with GPS technology so that the controller 102 is regularly updated on the position of all such equipment and inventory within the organization. The controller can provide such inventory-tracking information to certain users of the eyewear devices on a need-to-know basis. For instance, an employee who is expecting a package from another one of the corporation's offices may receive regular, real-time updates by way of his eyewear device on the status of his shipment. Such updates may include, for example, current location and estimated time of arrival. The controller may determine this information by combining the GPS data it receives with resources it can access (e.g., information from shipping companies, traffic information).

In another example, the drilling of a particular well may be subject to multiple constraints, including financial constraints, equipment constraints, equipment supply constraints, wellbore constraints, geological and geophysical constraints and legal constraints. The controller 102 may be informed of these constraints by one or more of the eyewear devices 104, the resources 106, and/or the corporate equipment 108. The controller 102 may also access historical data (e.g., formation material properties, well logs) that relates to the drilling of the well from the resources 106. Further still, the controller 102 may also access other types of information from the eyewear devices 104, the resources 106 and/or the corporate equipment 108; for example, a drilling engineer using an eyewear device 104 may provide his expert input on the well drilling project. The controller 102 then formulates an optimized drilling plan based on the collected information. As suggested above, the precise manner in which the controller 102 formulates the drilling plan or performs any other action is dependent on the software 114, which has been written by one of ordinary skill in the art in a manner suitable for the particular corporation within which the system 100 is deployed. One of ordinary skill in the art will recognize suitable ways in which the controller 102 may be programmed to perform drilling optimization tasks or any other task.

In another example, users of the eyewear devices 104 communicate with each other or other computer users that are in communication with the network 110 and/or network 112. In one such application, two employees of the corporation—each of whom is located in a different city—may wish to collaborate on a particular wireline tool project. Specifically, one of the employees ("employee A") may have on his desk a paper-based schematic that he wishes to share with his colleague ("employee B"). The employees may each don their respective eyewear devices 104 and establish a private communication session between themselves. Such a private session may be facilitated, for instance, by the controller 102. During the private session, employee A may train his eyewear device's camera on the paper schematic in front of him, thereby providing employee B with a virtual view of the paper schematic that is projected onto his eye using prism 210. Any actions that employee A takes—for instance, sketching on the paper schematic by hand—will be seen by employee B by way of the image being projected onto his eye by his eyewear device. In turn, employee B may provide feedback to employee A by speaking directly to employee A using his eyewear device, by providing tactile input to his eyewear device, or even by attempting to "write" on the virtual image of the schematic that appears to be in front of him—actions that would be detected by the camera on employee B's eyewear device and provided to employee A by way of employee A's eyewear device. In this way, employees A and B may collaborate efficiently, seamlessly and in real-time.

In another example, each of the eyewear devices 104 may be assigned a "role" that determines what information is and is not shown to the user of that eyewear device. The role to which a particular eyewear device is assigned depends on the user of the device. The eyewear device may be programmed to request login credentials from the user of the eyewear device so that the appropriate role may be used while that user wears the eyewear device. In some embodiments, the eyewear device performs a retinal scan of the user's eye to determine the user's identity and, therefore, the role that should be used. A table cross-referencing user identities and corresponding roles (with associated information access privileges) may form part of software 312 or may be stored in a remote location wirelessly accessible by the eyewear device 104.

For instance, a high-ranking senior executive of a corporation using the eyewear devices may have high security clearance and thus may be assigned a role that has access to any and all information pertaining to the corporation. He may tailor his role, however, so that despite his high security clearance he is provided with only information that is directly relevant to his position, to a particular project, to a particular group within the corporation, or to some other specific subject. Conversely, the eyewear device of a cement engineer may be assigned a low security clearance role, and the cement engineer may tailor his role so that he controls the type and amount of information with which he is provided. Roles may be grouped so that certain information that is transmitted by the controller 102 or by a particular eyewear device 104 is sent to a single eyewear device 104 or a group of eyewear devices 104. In this way, information can be distributed on a "need-to-know" basis. Thus, for instance, a team manager may transmit inputs to his eyewear device 104 (e.g., video, images, audio) to the eyewear devices of his team of engineers only. Similarly, the "action" that the controller 102 performs in a particular situation after considering all available information and resources may include controlling and/or providing information to one or more eyewear devices based on the eyewear devices' specific roles. Different roles may be assigned, for example and without limitation, to a drilling mud engineer, a cement engineer, a completion engineer, a drill bit engineer, data logging personnel, measurement while drilling personnel, directional drilling engineers, human safety personnel, environmental safety personnel, drilling rig personnel, geologists, geophysicists, rock mechanic specialists, managers, and executives. In addition, different people having the same job title may be assigned different roles; for instance, different cement engineers may be assigned different roles based on their seniority, office location, and any other such factors.

In still another example, a particular employee may use his eyewear device's role to access resources 106 that assist him in performing his duties. For instance, a rig hand may use his eyewear device to access an employee manual that provides a workflow that trains or assists the rig hand in performing a particular task, or, alternatively, the controller 102 may provide a workflow to the rig hand's eyewear device. The workflow may be provided to the rig hand's eyewear device in any suitable format. For example, the rig hand may be given step-by-step instructions on performing the task by text, audio and/or image- or video-based demonstrations. If necessary, the rig hand may use his eyewear device to contact technical support personnel, who may use their own eyewear devices to visualize what the rig hand is seeing at his work site and may assist him by, e.g., speaking with him using the eyewear devices.

In some embodiments, roles may be leveraged to enable eyewear device users to interact with computer displays and to view additional information relating to the displays based on their roles. Specifically, in such embodiments, a computer display displays an image that contains one or more "dynamic icons." A dynamic icon is an image—such as a QUICK RESPONSE® code or any other suitable type of bar code—containing information that an eyewear device can interpret based on its role and can use to provide additional, role-specific information to the eyewear device's user. The information embedded within the dynamic icon is dynamic in the sense that it can be updated as frequently as desired (e.g., at least once per hour). The software 312 contains code that enables the eyewear device to distinguish a dynamic icon from areas of an image that do not constitute a dynamic icon. In this way, an eyewear device executing software 312 is able to identify, capture and interpret a dynamic icon and perform an action accordingly. Because each eyewear device interprets dynamic icons based on role-specific software 312, multiple eyewear devices may interpret the same dynamic icon in different ways. In some cases, a particular dynamic icon may be of no interest to a particular role. In such cases, the eyewear device takes no action as a result of interpreting that particular dynamic icon.

In some embodiments, interpreting the dynamic icon may cause the eyewear device to provide its user with some role-specific information (e.g., text, image, video, or audio) that is embedded directly within the dynamic icon. In some embodiments, the dynamic icon may contain a reference (e.g., a link) to a remotely located source (e.g., to a website or FTP site) from which the eyewear device accesses information that is then provided to the user. In some embodiments, the reference may simply be to information that is already stored on the eyewear device. In some embodiments, the information that the eyewear device displays to its user is a function of the data that is embedded within the dynamic icon. For instance and without limitation, the dynamic icon may contain parameters that the eyewear device uses to calculate a different parameter, which is then displayed to the user. Determining the function of the data embedded within the dynamic icon may, in some embodiments, include accessing other resources (e.g., the cloud, resources 106). The scope of disclosure is not limited to the specific embodiments described above. In general, the information embedded within the dynamic icon may cause the eyewear device to perform any action. All such actions are encompassed within the scope of this disclosure.

Figure 5:
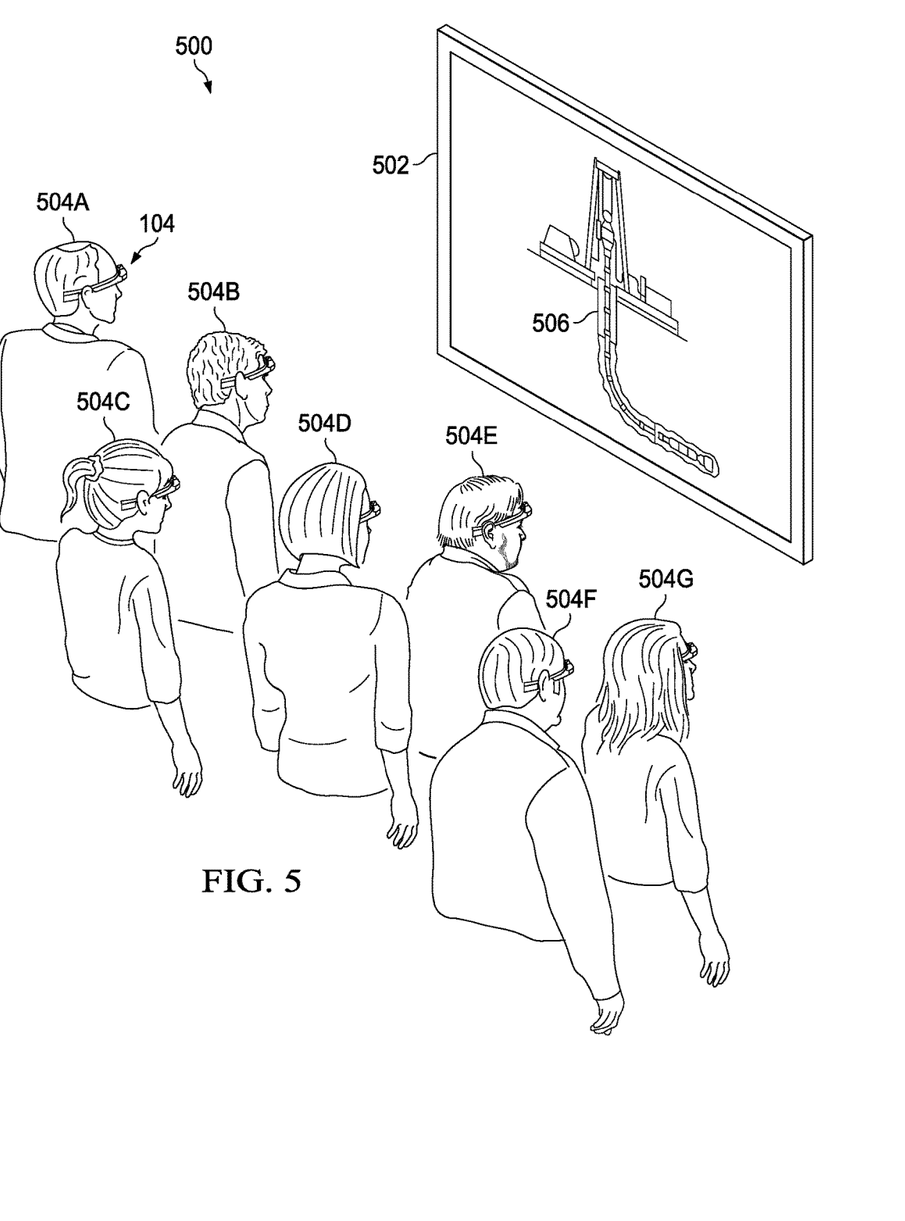
FIG. 5 is a perspective view of an illustrative environment in which the information collection, processing and distribution system disclosed herein may be deployed, in accordance with embodiments.

FIG. 5 is a perspective view of an illustrative environment 500 in which the information collection, processing and distribution system 100 may be deployed. The environment 500 includes a computer display 502 of any suitable size and type that displays an image 506. The environment 500 also includes multiple employees 504A-504G, each of whom wears an eyewear device 104. Each of the eyewear devices 104 in the environment 500 is associated with a different role. The software 312 in each of the eyewear devices 104 determines the role associated with that eyewear device 104.

In operation, the display 502 displays the image 506, which includes one or more dynamic icons that are updated one or more times by the computer that drives the display 502. Each of the eyewear devices 104 worn by users 504A-504G is programmed with software 312 to interpret the dynamic icons in the image 506. For example, when user 504A views the image 506, he sees the image 506 as it appears on the display 506 but, in addition, his eyewear device 104 augments the image 506 by projecting additional information toward his eye. Thus, he sees image 506 and additional information that appears as an additional layer of information in front of the image 506. The additional information is provided to user 504A as a result of his eyewear device 104 interpreting one or more dynamic icons present in the image 506. In some embodiments, the user 504A may then interact with the additional information. For instance, he may use a finger to interact with the virtual image that appears before him, and the camera coupled to his eyewear device 104 captures, processes and responds to his interactions as software 312 permits. Alternatively or in addition to such interaction, the user 504A may issue voice commands and/or provide tactile input that is captured and processed by his eyewear device 104. These interactions are merely illustrative and they do not limit the scope of disclosure.

In some embodiments, the eyewear device 104 of user 504A interprets a dynamic icon and performs an action in response to the dynamic icon, but it provides no information to the user 504A. In some embodiments, the eyewear devices 104 interpret the same dynamic icon(s) in different ways because each of the eyewear devices 104 is associated with a different role. For instance, the user 504A may wear an eyewear device 104 that performs an action as a result of interpreting a particular dynamic icon. In contrast, the user 504B may wear an eyewear device 104 that performs no action at all after interpreting the same dynamic icon, because that dynamic icon may be irrelevant to the user 504B. Similarly, users 504C-504G all may use eyewear devices 104 that react differently to the same dynamic icon.

Figure 6:
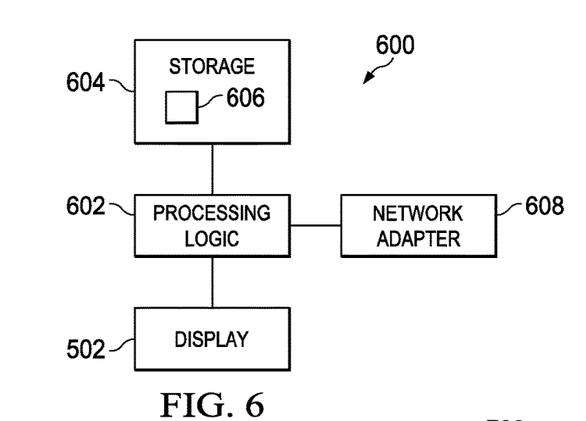
FIG. 6 is a block diagram of components associated with a display system, in accordance with embodiments.

FIG. 6 is a block diagram of a display system 600 associated with the display 502. Specifically, the display system 600 comprises the display 502, processing logic (e.g., one or more processors) 602 and storage 604. In turn, storage 604 stores software 606. The processing logic 602 executes the software 606 to display images on the display 502 as described herein. The processing logic 602 is able to communicate with other electronic devices (e.g., eyewear devices 104, controller 102, resources 106, corporate equipment 108) via network adapter 608. Thus, for example, the processing logic 602 may provide information relating to dynamic icons (e.g., instructions on interpreting dynamic icons) to one or more eyewear devices 104. Similarly, eyewear devices 104 may communicate with the processing logic 602 to interact with the image shown on display 502. For instance, the eyewear device 104 of user 504A may interpret a dynamic icon and may display additional information to user 504A as a result. The user 504A may provide input to his eyewear device 104 in an effort to interact with the additional information displayed to him. These interactions may cause the eyewear device 104 to modify the additional information that it displays to him. Alternatively or in addition, these interactions may cause the eyewear device 104 to effectuate changes to the image shown on display 502 by communicating with the processing logic 602. All such variations in interactions and communications between the various electronic devices disclosed herein are contemplated and fall within the scope of this disclosure.

Figure 7:
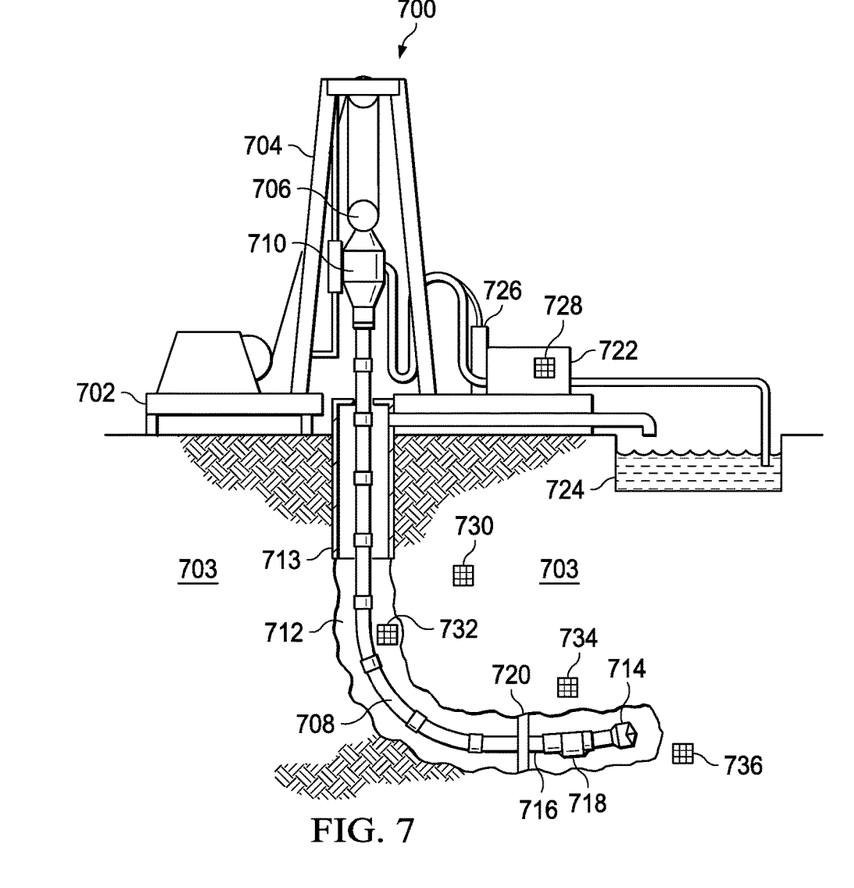
FIG. 7 is an image containing dynamic icons, in accordance with embodiments.

FIG. 7 is an image 700 such as that which may be displayed on the display 502 of FIGS. 5 and 6. As explained below, the image 700 also comprises multiple dynamic icons. The image 700 shows a drilling platform 702 that supports a derrick 704 having a traveling block 706 for raising and lowering a drill string 708. A top-drive motor 710 (or, in other embodiments, a rotary table) supports and turns the drill string 708 as it is lowered into the borehole 712. The drill string's rotation, alone or in combination with the operation of a downhole motor, drives the drill bit 714 to extend the borehole. The drill bit 714 is one component of a bottomhole assembly (BHA) 716 that may further include a rotary steering system (RSS) 718 and stabilizer 720 (or some other form of steering assembly) along with drill collars and logging instruments. A pump 722 circulates drilling fluid through a feed pipe to the top drive 710, downhole through the interior of drill string 108, through nozzles in the drill bit 714, back to the surface via the annulus around the drill string 108, and into a retention pit 724. The drilling fluid transports drill cuttings from the borehole 712 into the retention pit 724 and aids in maintaining the integrity of the borehole. An upper portion of the borehole 712 is stabilized with a casing string 713 and the lower portion being drilled is an open (uncased) borehole. A surface interface 726 serves as a hub for communicating via a telemetry link and for communicating with the various sensors and control mechanisms on the platform 702. The image 700 also comprises multiple dynamic icons 728, 730, 732, 734 and 736.

Figure 8:
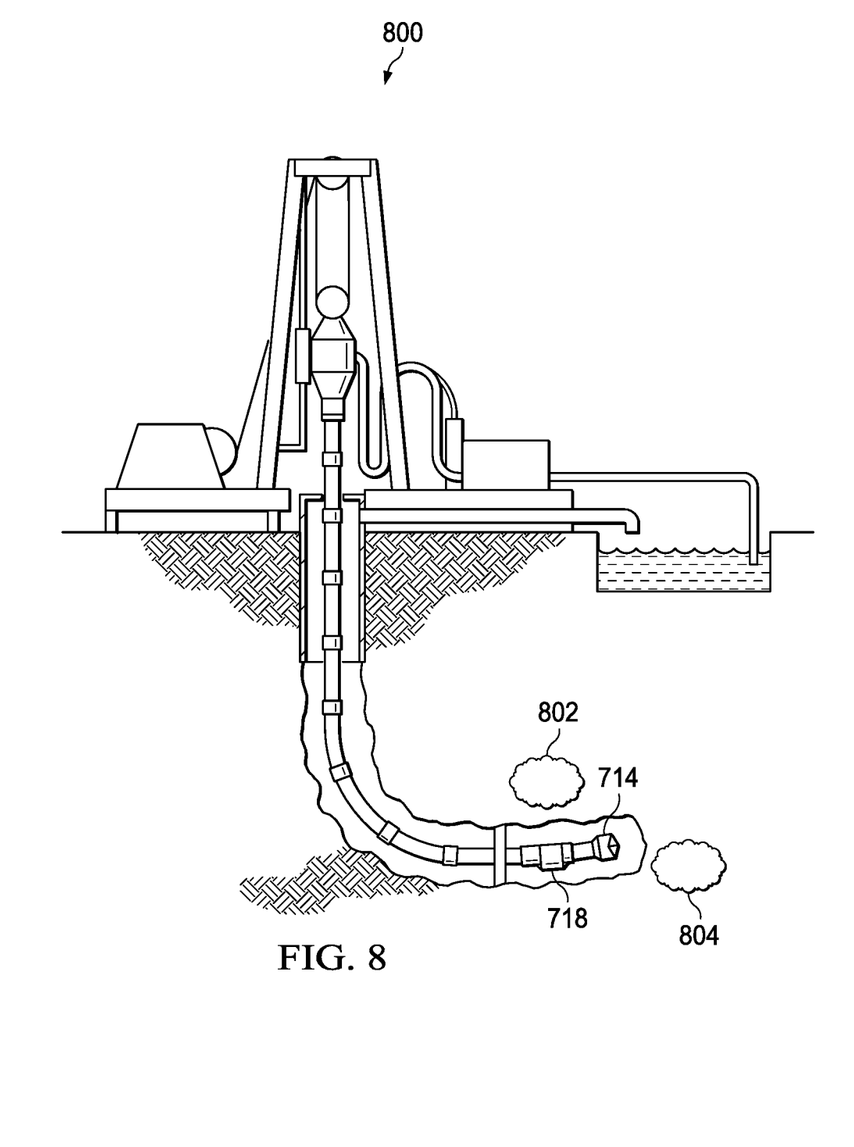
FIGS. 8-10 are dynamic icon-embedded images as viewed using different eyewear devices, in accordance with embodiments.
Figure 9:
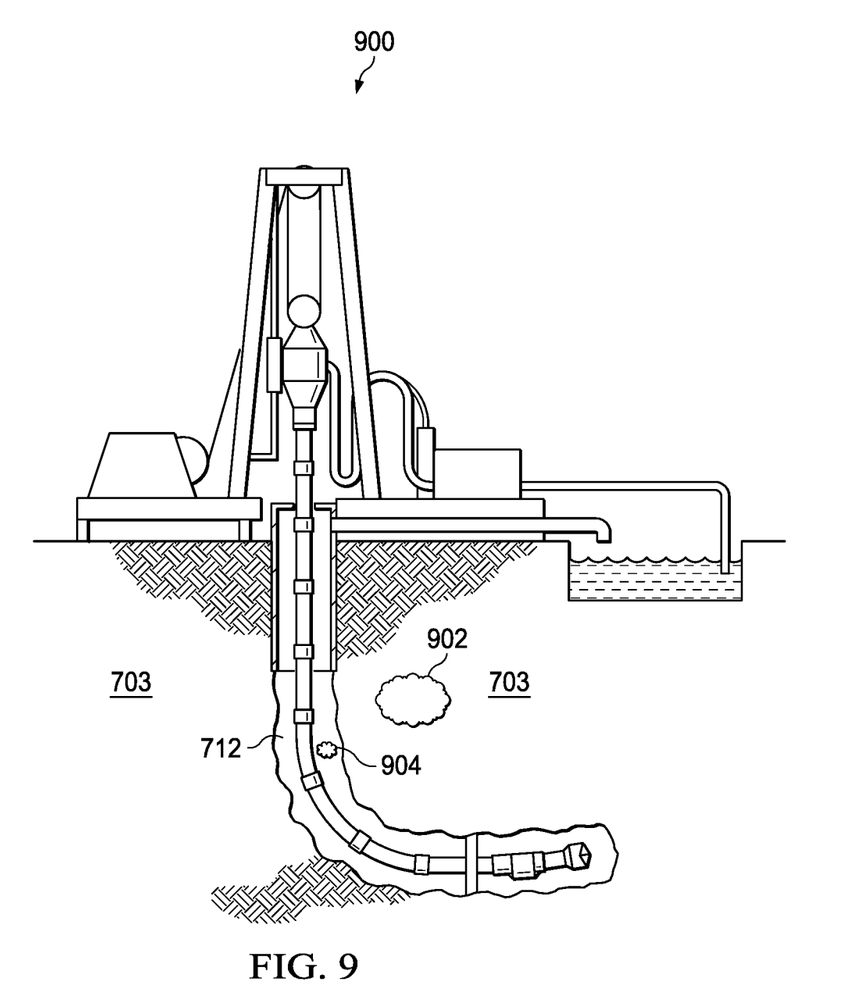
Figure 10:
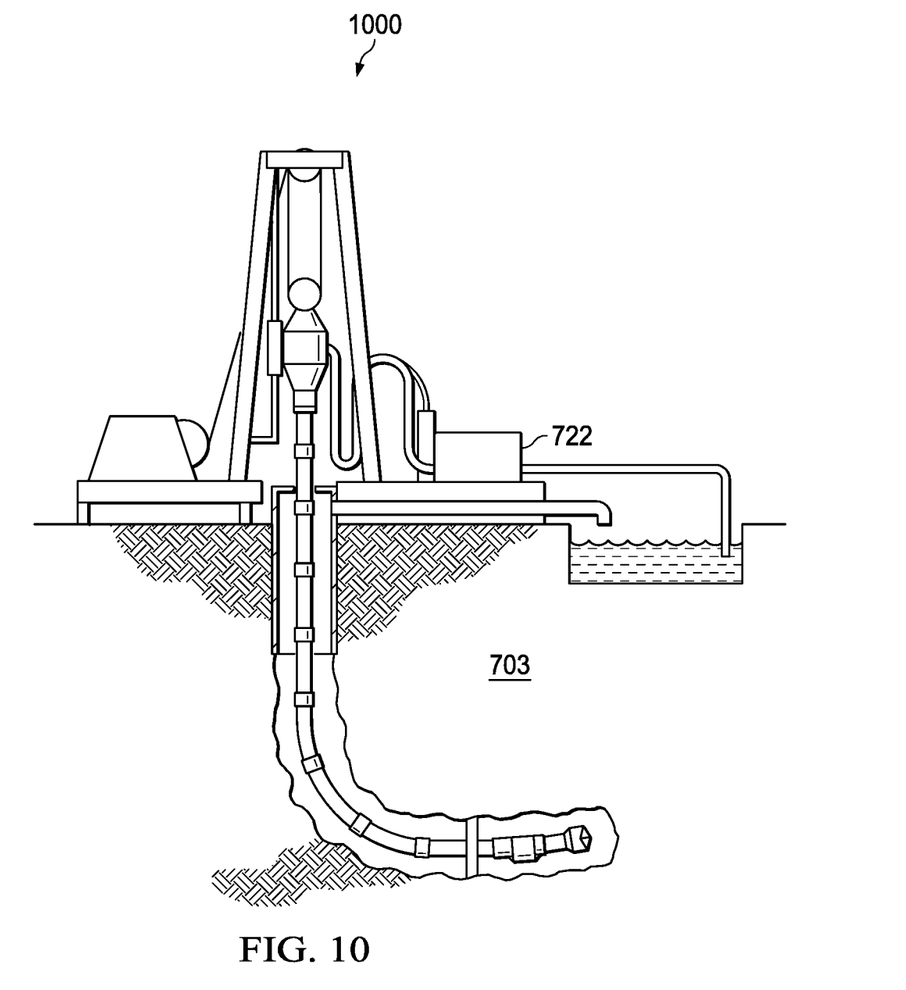

FIGS. 8-10 are images showing what different users 504A-504C (of FIG. 5), respectively, may see when they view the image 700 using their eyewear devices 104. FIG. 8 shows an image 800 that is similar in many respects to image 700. The eyewear device 104 of user 504A, however, captures and interprets the dynamic icons in image 700 and determines that icons 734, 736—which relate to RSS 718 and drill bit 714, respectively—are relevant to the user 504A, while the remaining icons are not. Accordingly, the eyewear device 104 of user 504A performs actions based on its interpretation of dynamic icons 734, 736. In this instance, the eyewear device 104 displays to the user 504A additional information 802, 804 (depicted as clouds for simplicity), which relate to dynamic icons 734, 736, respectively. The user 504A may then choose to interact with the additional information 802, 804 as described above. The image 800 as depicted in FIG. 8 does not necessarily show all information that the user 504A may see. For instance, the dynamic icons 728, 730, 732 may still be visible to the user 504A.

FIG. 9 shows image 900, which is similar in many respects to image 700. The eyewear device 104 of user 504B, however, captures and interprets the dynamic icons in image 700 and determines that icons 730, 732—which relate to the formation 703 and wellbore 712, respectively—are relevant to the user 504B, while the remaining icons are not. Accordingly, the eyewear device 104 of user 504B performs actions based on its interpretation of dynamic icons 730, 732. In this instance, the eyewear device 104 displays to the user 504B additional information 902, 904 (depicted as clouds for simplicity), which relate to dynamic icons 730, 732, respectively. The user 504B may then choose to interact with the additional information 902, 904 as described above. The image 900 as depicted in FIG. 9 does not necessarily show all information that the user 504B may see.

FIG. 10 shows image 1000, which is similar in many respects to image 700. The eyewear device 104 of FIG. 504C, however, captures and interprets the dynamic icons in image 700 and determines that only icon 728—which relates to the pump 722—is relevant to the user 504C, while the remaining icons are not. Accordingly, the eyewear device 104 of user 504C performs an action(s) based on its interpretation of dynamic icon 728. In this instance, the dynamic icon 728 contains information that causes the eyewear device 104 to automatically shut off the pump 722 without first consulting the user 504C. Thus, no additional information is displayed to the user 504C when he views the image 700 using his eyewear device 104. The image 1000 as depicted in FIG. 10 does not necessarily show all information that the user 504C may see.

Although the foregoing embodiments describe dynamic icons in context of computer displays, in some embodiments, computer displays are not used. For instance, a static icon (i.e., an icon that is not regularly modified) may be printed on paper and posted in any suitable location (e.g., an instrument panel near a well). An eyewear device 104 can capture and interpret the static icon in a manner similar to that which it uses to capture and interpret dynamic icons. The device 104 may then perform one or more actions based on the contents of the static icon.

Figure 11:
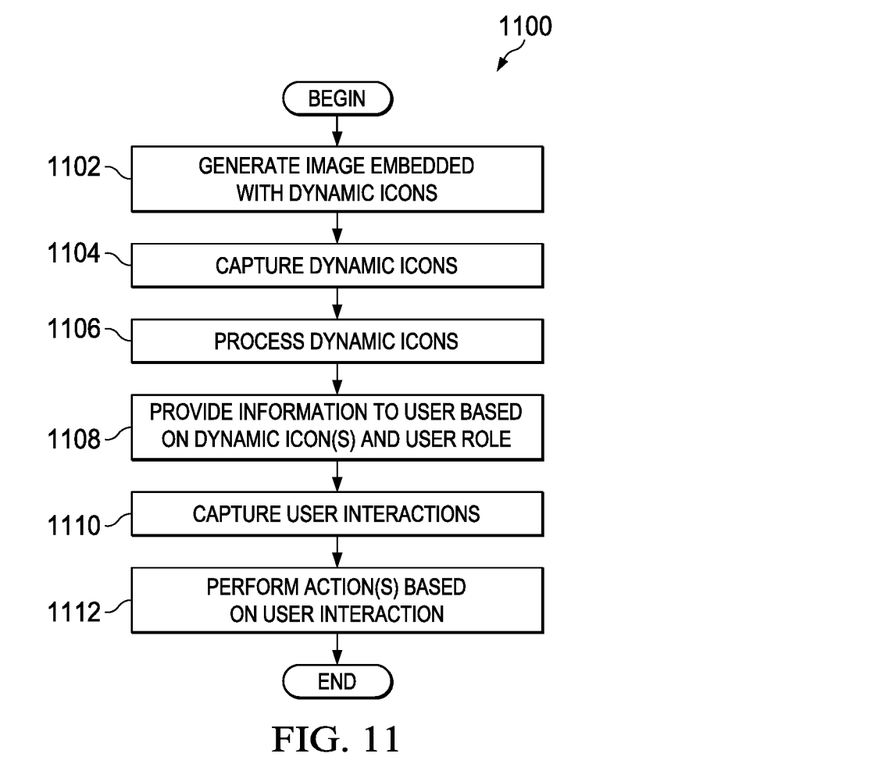
FIG. 11 is a flow diagram of another method in accordance with embodiments.

FIG. 11 is a flow diagram of an illustrative method 1100 usable to capture and process dynamic icons and to perform one or more actions based on the contents of the dynamic icons. The method 1100 begins by generating an image embedded with dynamic icons (step 1102). The method 1100 also comprises an eyewear device camera capturing the dynamic icons (step 1104). The method 1100 next comprises processing the dynamic icons in the image (step 1106). As explained in detail above, in at least some embodiments, each eyewear device processes a dynamic icon in a different way based on the roles with which that eyewear device is associated. For example, a single dynamic icon may cause a first eyewear device to show supplemental information to its user, a second eyewear device to activate a logging tool, and a third eyewear device to do nothing because the dynamic icon is irrelevant to its user. The method 1100 then comprises performing an action based on the interpreted dynamic icon, such as using an eyewear device to display additional information to its user (step 1108). The method 1100 next comprises optionally capturing user interactions with the additional information that may have been provided to the user in step 1108 (step 1110). Such input may comprise, for example, voice commands and tactile input.

Finally, the method 1100 comprises performing an action based on the optional user interaction of step 1110 (step 1112). Such an action(s) may include, for instance, providing additional information to the user, controlling a remote device, accessing resources, or any other suitable action(s) that the eyewear device is capable of performing. The method 1100 is not limited to the precise set of steps shown in FIG. 11, and steps may be added, deleted or modified as may be suitable for the particular circumstances in which the method is performed.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

The present disclosure encompasses numerous embodiments. At least some of these embodiments are directed to a role-based information distribution system that comprises a display to provide an image containing multiple dynamic icons; a wearable device camera to capture the image; and processing logic, coupled to the camera, to interpret the multiple dynamic icons and to provide information pertaining to a selected one or more of the multiple dynamic icons to a user via the wearable device. The processing logic selects the selected one or more of the multiple dynamic icons based on a role associated with the user. Such embodiments may be supplemented in a variety of ways, including by adding any of the following concepts, in any sequence and in any combination: the processing logic interprets the multiple dynamic icons based on the role; at least one of the multiple dynamic icons contains a reference to an information source accessible via a network, and wherein the processing logic accesses the information source via the network to obtain the information; at least one of the multiple dynamic icons contains the information that the processing logic provides to the user; at least one of the multiple dynamic icons contains data that the processing logic uses to determine the information; at least one of the multiple dynamic icons contains data based on which the processing logic performs an action; to perform the action, the processing logic controls a device via a network; the processing logic solicits input from the user based on the at least one of the multiple dynamic icons, and wherein the processing logic performs the action based on the input; a second wearable device camera to capture the image, and second processing logic, coupled to the second camera, to interpret the multiple dynamic icons, wherein the processing logic interprets the selected one or more of the multiple dynamic icons differently than a manner in which the second processing logic interprets the selected one or more of the multiple dynamic icons; the information includes instructions by which the user is to perform a task; and the system is an oilfield services system.

At least some of the embodiments in the present disclosure are directed to an information distribution eyewear device that comprises a camera that captures an image associated with a dynamic icon; and processing logic, coupled to the camera, that interprets the dynamic icon based on a role associated with the eyewear device to determine information; wherein the processing logic provides the information to a user of the eyewear device. Such embodiments may be supplemented in a variety of ways, including by adding any of the following concepts, in any sequence and in any combination: the processing logic performs an action based on the interpretation; the image is associated with a second dynamic icon, the processing logic interprets the second dynamic icon, and based on the interpretation, the processing logic does not provide the user with information associated with the second dynamic icon; the image is either provided electronically on a display or provided non-electronically on a physical object; and the role corresponds to information access privileges associated with the user.

At least some embodiments in the present disclosure are directed to a method for distributing information in an oilfield environment, comprising displaying an image having first and second dynamic icons; using a first eyewear device to capture and interpret the first and second dynamic icons based on a first role associated with the first eyewear device; using a second eyewear device to capture and interpret the first and second dynamic icons based on a second role associated with the second eyewear device; providing a first user of the first eyewear device with information obtained by interpreting the first dynamic icon; providing a second user of the second eyewear device with information obtained by interpreting the second dynamic icon; obtaining input from the first user provided in response to the provision of the information obtained by interpreting the first dynamic icon; obtaining input from the second user provided in response to the provision of the information obtained by interpreting the second dynamic icon; performing an action based on the input obtained from the first user; and performing another action based on the input obtained from the second user. Such embodiments may be supplemented in a variety of ways, including by adding any of the following concepts or steps, in any sequence and in any combination: the dynamic icon is selected from the group consisting of a QUICK RESPONSE® code and a barcode; not providing the first user with the information obtained by interpreting the second dynamic icon and not providing the second user with the information obtained by interpreting the first dynamic icon; and providing the second user of the second eyewear device with other information obtained by interpreting the first dynamic icon, wherein the other information and the information obtained by the first eyewear device interpreting the first dynamic icon are different from each other.

The following is claimed:

1. A role-based information distribution system, comprising:
   a wearable device including:
      a camera to capture an image with one or more icons; and
      a display providing the image and operable to overlay the image with information associated with the one or more icons; and
   processing logic, coupled to the wearable device, to interpret the one or more icons and to select and provide the information based on a role associated with a user of the wearable device.

2. The role-based information distribution system of claim 1, wherein the processing logic interprets the one or more icons based on said role.

3. The role-based information distribution system of claim 1, wherein at least one of the one or more icons contains a reference to an information source accessible via a network, and wherein the processing logic accesses said information source via the network to obtain said information.

4. The role-based information distribution system of claim 1, wherein at least one of the one or more icons contains said information that the processing logic provides to the user.

5. The role-based information distribution system of claim 1, wherein at least one of the one or more icons contains data that the processing logic uses to determine said information.

6. The role-based information distribution system of claim 1, wherein at least one of the one or more icons contains data based on which the processing logic performs an action.

7. The role-based information distribution system of claim 6, wherein, to perform said action, the processing logic controls a device via a network.

8. The role-based information distribution system of claim 6, wherein the processing logic solicits input from the user based on said at least one of the one or more icons, and wherein the processing logic performs said action based on the input.

9. The role-based information distribution system of claim 1, further comprising:
  a second wearable device including a second camera to capture said image and a second display; and
  second processing logic, coupled to the second wearable device, to interpret said one or more icons,
  wherein the processing logic interprets the selected one or more of the multiple dynamic icons differently than a manner in which the second processing logic interprets the selected one or more of the one or more icons.

10. The role-based information distribution system of claim 1, wherein the information includes instructions by which the user is to perform a task.

11. The role-based information distribution system of claim 1, wherein the system is an oilfield services system.

12. An information distribution eyewear device, comprising:
  a camera that captures an image with an icon;
  a display providing the image; and
  processing logic, coupled to the camera, that interprets the icon based on a role associated with the eyewear device to determine information,
  wherein the processing logic provides said information to a user of the eyewear device by overlaying the image with the information associated with the icon.

13. The eyewear device of claim 12, wherein the processing logic performs an action based on said interpretation.

14. The eyewear devices of claim 12, wherein:
  the image is associated with a second icon;
  the processing logic interprets the second icon; and
  based on said interpretation, the processing logic does not provide the user with information associated with the second icon.

15. The eyewear devices of claim 12, wherein said image is either provided electronically on a display or provided non-electronically on a physical object.

16. The eyewear devices of claim 12, wherein said role corresponds to information access privileges associated with the user.

17. A method for distributing information in an oilfield environment, comprising:
  using a first eyewear device to capture and interpret an image with first and second icons based on a first role associated with the first eyewear device;
  using a second eyewear device to capture and interpret the first and second dynamic icons based on a second role associated with the second eyewear device;
  providing a first user of the first eyewear device with information obtained by interpreting the first icon by overlaying the image in a display of the first eyewear device with the information;
  providing a second user of the second eyewear device with information obtained by interpreting the second icon by overlaying the image in a display of the second eyewear device with the information;
  obtaining input from the first user provided in response to a provision of said information obtained by interpreting the first icon;
  obtaining input from the second user provided in response to a provision of said information obtained by interpreting the second icon;
  performing an action based on said input obtained from the first user; and
  performing another action based on said input obtained from the second user.

18. The method of claim 17, wherein the icon includes a barcode.

19. The methods of claim 17 further comprising not providing the first user with said information obtained by interpreting the second icon and not providing the second user with said information obtained by interpreting the first icon.

20. The methods of claim 17 further comprising providing the second user of the second eyewear device with other information obtained by interpreting the first icon, wherein the other information and the information obtained by the first eyewear device interpreting the first icon are different from each other.

* * * * *